United States Patent Office.

CHARLES ELLERY AVERY, OF JACKSONVILLE, FLORIDA.

PROCESS OF PREPARING LOGWOOD EXTRACT.

SPECIFICATION forming part of Letters Patent No. 320,526, dated June 23, 1885.

Application filed November 28, 1884. (No specimens.)

*To all whom it may concern:*

Be it known that I, CHARLES ELLERY AVERY, a citizen of the United States, residing at Jacksonville, in the county of Duval and State of Florida, have invented certain new and useful Improvements in the Preparation of Liquors or Extracts of Logwood, (*Hæmatoxylon, Campechianum;*) and I do hereby declare that the following is a full, clear, and exact description of the invention, which will enable others skilled in the art to which it appertains to make and use the same.

Heretofore logwood-liquors, as used by printers of goods, have been made without oxidation to remove the hydrogen of the hæmatoxylin, or, in other words, to form hæmatein, the liquor has been printed on the goods mixed with mordants that could oxidize it, as the nitrates of copper or iron, or chlorate of potash have been added to the mixture of liquor and mordant, and the cloth steamed to develop the color by oxidation and unite the color with the mordant. The same extraction process has been mostly in use for the preparation of dyers' liquors or extracts, though some manufacturers of greater skill "cure" their wood in powder by wetting with alkaline solutions, forming beds of the wet powder, often shoveled over to prevent destruction of the dye by over oxidation. The cured wood is then extracted as usual.

The object of my invention is to supersede the use of oxidants by the printer, which often weakens the fiber of the goods, and to do away with the "curing" process, which requires skilled labor and much muscular labor. The curing process usually leaves a part of the hæmatoxylin unavailable, because not oxidized into hæmatein, or a part becomes over oxidized, insoluble, and worthless to the dyer. In fact both faults are usually found in the same liquor. I substantially avoid this loss.

To carry my invention into effect I extract the logwood as soon as cut, without curing. Partial curing does not render the oxidation of the liquor useless, but is unnecessary, as the oxidation is much better effected in the liquor. To the liquor I add a solution of any substance that is soluble, and will oxidize hæmatoxylin to hæmatein by the removal of hydrogen. The bodies I prefer are the clear solution of bleaching-powder—those of the chlorates and nitrates of the alkalies, and lime. The chlorates in this operation appear to be reduced to chlorides and the nitrates to nitrites. The solution of bleaching-powder will do the work, even if the liquors are cold; but the chlorates and nitrates require a heated liquor and work best under pressure at heats above the boiling-point. If acids or acid salts be added to the mixture of logwood-liquor and solution of chlorates or nitrates, the freed oxidizing acids more readily oxidize at lower temperatures.

I prefer to use an oxidizer like the nitrates or chlorates, whose solution may be thoroughly diffused through the logwood-liquor before oxidation takes place, as from increase of temperature or addition of acids or acid-yielding salts. For if the solutions of immediate oxidizers—as of bleaching powder or of hypochlorous acid—be used, a portion of the hæmatein formed returns to the oxidizer before all the hæmatoxylin is oxidized and a loss of dye ensues from over-oxidized hæmatein or unoxidized hæmatoxylin.

The quantity of hæmatoxylin to be oxidized varies very much in different samples of logwood and its extract also, both from natural causes and from adulteration with glucose, molasses, extracts of bark, &c. The exact assay of hæmatoxylin is difficult, if possible. The readiest practical means of ascertaining the quantity of any oxidizer to be used is to make an extract of a known quantity of logwood or a solution of an extract: take a part and add to it the supposed required quantity of oxidizer. To another part add some more. To another part some less. In the same water-bath, to secure like temperatures, place three beakers containing like amounts of water, and when at dyeing-heat—say, 140° Fahrenheit or more—add like quantities by a small pipette of the three liquors, liquor A to beaker marked "A," liquor B to beaker B, &c. In each place a swatch of mordanted-test cloth of equal size large enough to readily take up all the dye put in, a point easily found by the chemist or director of a works. If the most oxidized is deepest dyed, more oxidant is likely to be needed. If the least oxidized is deepest dyed, less oxidation. If the medium oxidation is deepest dyed, it is about right, and any variation should be on the side of the swatch next deepest in shade. By a few trials of this sort the amount of oxidizer is found, and for that cargo of wood or brand of extract remains nearly the same in practice.

A logwood yielding ten per cent. of hæmatoxylin will require about one and four-tenths per cent. of its weight of chlorate of potash, and of other chlorates proportionally as their contained oxygen, or of nitrate of sodium nearly three per centum, other nitrates proportionally in their contents of $NO_3$, a pound of hæmatoxylin requiring about one-nineteenth of its weight of available oxygen to develop its dyeing powers.

When the wood is cured in the ordinary way, the dye is wasted by lack of oxidation or over oxidation, and often both ways. Where the dyer uses oxidizing mordants, both mordant and color unite in the bath and are lost, or, even if skillfully handled, much is loosely fixed on the goods to the injury of the color and the goods. Here the loss is both in color and in mordant. The oxidized liquor acting on a mordant mechanically fast yields a dye mechanically fast. The printer using the oxidized liquor no longer needs the risk of tendering the fiber or the loss of coloring power by deficient oxidation of the dye.

I claim—

1. The oxidation of logwood liquors or extracts of the same after their extraction from the wood and before they are mingled with the necessary mordants by the formation of hæmatein from hæmatoxylin under the action of the oxidants set forth, such as solution of bleaching-powder, hypochlorous acid, chloric acid, chlorates or nitrates of the alkalies, and alkaline earths, as set forth.

2. The oxidation of logwood liquors or extracts of the same after their extraction from the wood and before they are mingled with the necessary mordants by oxidizing substances, such as solutions of chlorates of potash or of lime, or nitrates of potash, soda, or lime, which, while mixing with the logwood-liquor at moderate temperatures, oxidize slowly or not at all, but on raising the temperature, particularly under pressure or by the addition of acids or acid salts, become oxidizers of hæmatoxylin to hæmatein, as set forth.

CHARLES ELLERY AVERY.

Witnesses:
 ROBT. W. BENNETT,
 BENJ. H. BRADLEE.